(12) United States Patent
Sathaye et al.

(10) Patent No.: US 11,775,292 B1
(45) Date of Patent: Oct. 3, 2023

(54) COMPLETING PARTIALLY CONSTRUCTED DESIGNS AND CREATING NEW DESIGNS BASED ON EXISTING DESIGNS

(71) Applicant: Dell Products, L.P., Hopkinton, MA (US)

(72) Inventors: Sumedh Sathaye, Austin, TX (US); Reut Kovetz, Tel Aviv (IL); Patrick East, Arvada, CO (US); Jennifer Minarik, Zionsville, IN (US); Kelly Lisai, Austin, TX (US)

(73) Assignee: Dell Products, L.P., Hopkinton, MA (US)

( * ) Notice: Subject to any disclaimer, the term of this patent is extended or adjusted under 35 U.S.C. 154(b) by 76 days.

(21) Appl. No.: 17/719,619

(22) Filed: Apr. 13, 2022

(51) Int. Cl.
*G06Q 10/06* (2023.01)
*G06F 9/451* (2018.01)
*G06F 9/455* (2018.01)
*G06F 8/71* (2018.01)

(52) U.S. Cl.
CPC ..................... *G06F 8/71* (2013.01)

(58) Field of Classification Search
CPC .... G06Q 10/10; G06Q 30/02; G06Q 10/0633; G06Q 10/06312; G06F 8/71; G06F 9/453; G06F 8/38; G06F 3/0482; G06N 5/04; G06N 20/20
See application file for complete search history.

(56) References Cited

U.S. PATENT DOCUMENTS 11,086,754 B2 * 8/2021 Bhide ................. G06F 11/3608

OTHER PUBLICATIONS

Sukamto et al., Enhancing the User Experience of Portal Website using User-Centered Design Method, 5 pages (Year: 2020).*

* cited by examiner

*Primary Examiner* — Thuy Dao
(74) *Attorney, Agent, or Firm* — Anderson Gorecki LLP

(57) ABSTRACT

A partially completed user experience design can be completed by selecting a previous codified user experience design, and determining portions of a Finite State Machine of the previous codified user experience design that should be added to a FSM of the partially completed user experience design. This enables use of a previous codified user experience designs to complete the FSM of a partially completed user experience design. Previously codified user experience designs can also be used as the basis for creation of new user experience designs. A previously codified user experience design is selected, and newly created portions of the FSM that are to be added to the FSM of the previously codified user experience design are added to the FSM of the previously codified user experience design. In both instances, components and patterns of the user experience design are automatically substituted to ensure uniformity within the created design.

20 Claims, 9 Drawing Sheets

Example User Experience Definition

FIG. 5  Select existing design

Complete new design from existing design

COMPLETING PARTIALLY CONSTRUCTED DESIGNS AND CREATING NEW DESIGNS BASED ON EXISTING DESIGNS

FIELD

This disclosure relates to computing systems and related devices and methods, and, more particularly, to a method and apparatus for using existing codified and versioned user experience designs to complete partially constructed user experience designs and using existing codified and versioned user experience designs to create new user experience designs.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

According to some embodiments, a method and apparatus for using existing codified user experience designs to complete partially constructed user experience designs and to create new user experience designs is provided. In some embodiments, designers create user experience designs which are entered into an Experience Design Codification and Management System (EDCMS). The EDCMS retrieves a user experience definition, and generates a comprehensive user experience specification from the user experience definition.

If a partially completed user experience design is entered into the EDCMS, the persona and outcome of the partially completed user experience design are read and used to identify a subset of previous codified user experience designs that have similar personas and outcomes. A user experience design may be designated to the EDCMS as partially completed, for example by tagging the user experience design with a Work In Progress (WIP) tag.

The EDCMS uses the persona and outcome of the WIP user experience design to select one or more previous codified and versioned user experience designs with similar personas and outcomes. One of the previous codified and versioned user experience designs is selected and used to complete the partially constructed user experience design. In some embodiments, a Finite State Machine (FSM) of the WIP user experience design and a FSM of the previous codified user experience design are walked to determine parts of the two FSMs that are similar. Persona based heuristics, or designer user input identifying the parts of the FSM, are used to determine replacement rules for the FSM to determine which portions of the FSM of the WIP user experience design should be replaced with portions of the FSM from the previous codified user experience design. When a portion of the FSM of the WIP user experience design is replaced with a portion of the FSM from the previous codified user experience design, the existing components and styles of the selected portion of the FSM from the previous codified user experience design that was added to the FSM of the WIP design are replaced with the components and styles of the WIP user experience design, to enable the entire FSM of the WIP user experience design to have consistent components and styles.

If a new user experience design is to be created from one or more existing previously completed user experience designs, the persona and outcome of the proposed new design, and any new portion of the FSM of the proposed design, are entered into the EDCMS. A proposed new design may be tagged, for example, with a MODS tag to identify the proposed new design as a design that should be created by modifying an existing user experience design. The EDCMS uses the persona and outcome of the proposed MODS user experience design to identify a subset of previous codified user experience designs that have similar personas and outcomes.

One of the previous codified and versioned user experience designs is selected and the FSM of the MODS design and the FSM of the previous codified user experience design are walked to identify portions of the FSM from the MODS design that should be added to or that should be used to replace portions of the FSM of the selected previous codified and versioned user experience design.

DETAILED DESCRIPTION

Figure 1:
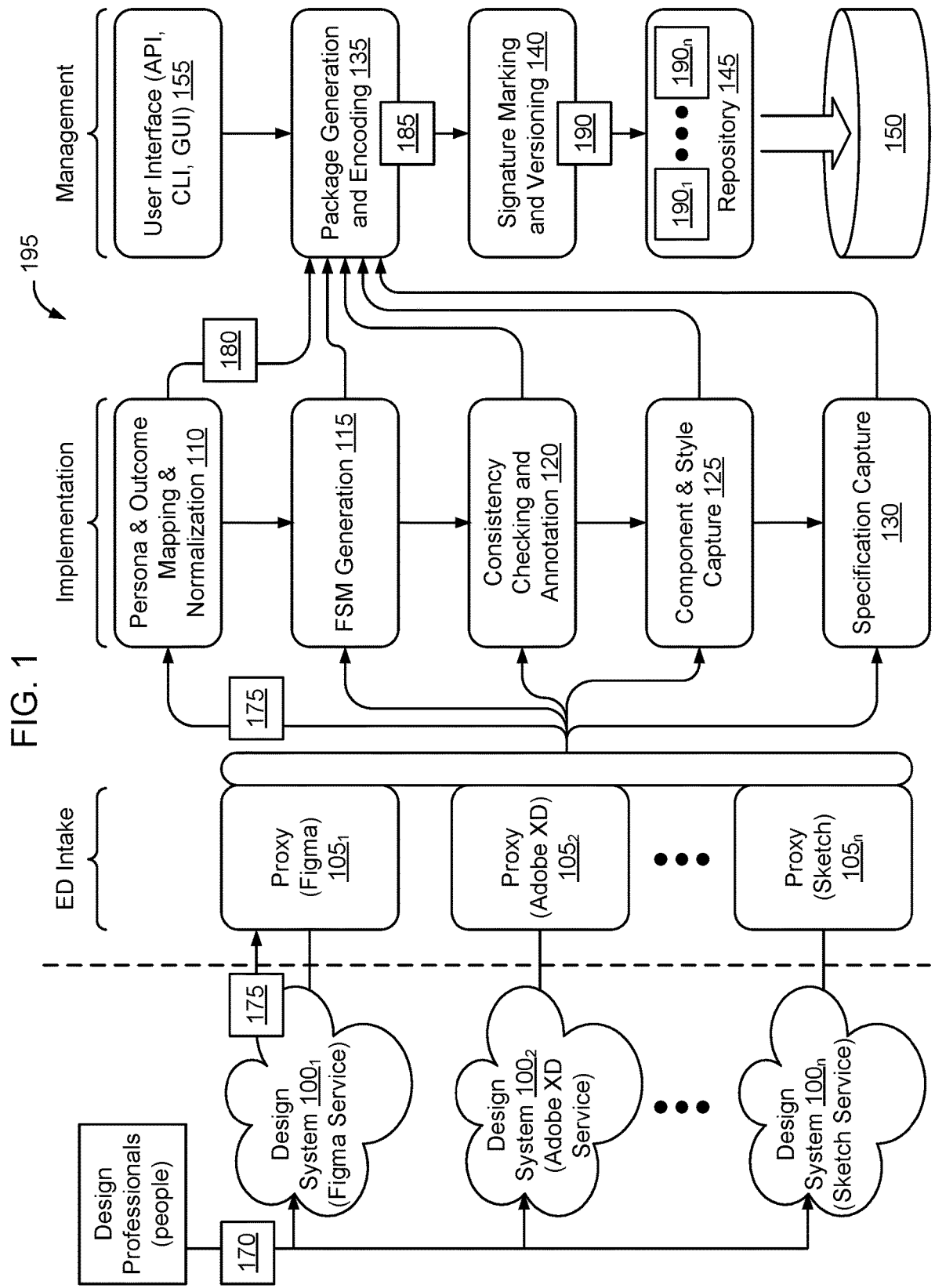
FIG. 1 is a functional block diagram of an example Experience Design Codification and Management System (EDCMS) interfaced with external user experience design systems, according to some embodiments.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Storage systems are used to provide storage services for host applications. When a host application wants to have data stored on a given storage system, the necessary storage volumes are created on the storage system by interacting with a user interface to the storage system. Humans can interact with the storage system, and likewise other automated processes can interact with the storage system.

Any interaction, whether it be between a human actor and a machine such as a storage system, or between two computer implemented systems, constitutes a "user experience" with a product. User experience design is the process of supporting user behavior through usability, usefulness, and desirability provided in the interaction with a product. Although an example system for codifying user experience designs and managing the codified user experience designs will occasionally be described in the context of codifying and managing user experience designs that are configured to enable users and storage systems to interact, it should be understood that embodiments may be used in many contexts, and are not limited to use in the context of codifying and managing user experience designs in the context of a storage system.

An example of a user experience design might be, for example, a Graphical User Interface (GUI) component or set of screens that are configured to enable a user to access a particular feature on a storage system. User experiences are designed, for example using design systems 100, to enable the graphical user interface to be used to achieve a particular objective. In the context of a GUI that is used to interface a software program, the term "user experience design", as used herein, is used to refer to a set of graphic components and transitions between states that enable a user to navigate, through the GUI, to enable the user to access the intended feature of the software program. In the context of a CLI, the term "user experience design" is used to refer to a selected set of scripts that are arranged in a package, in which each package contains an ordered set of API calls and input parameters, that are arranged to enable the user to access the intended objective. In the context of an API, the term "user experience design" is used to refer to a selected set of files that are arranged in a playbook, in which each file contains an ordered set of API calls and input parameters, that enable the user to access the intended objective.

Conventionally, user experience designs would be created by experience designers. For example, if a new feature is to be added to a software product, and the software product has a graphical user interface (GUI), often the GUI will need to be modified to enable the users to access the new feature of the software product. Stated differently, a new user experience will need to be created (designed) to enable the user to access the new feature of the software product. To create the new user experience, a software interaction design professional would create a version of how the GUI may be configured, to enable a person to access the new feature through the software product's GUI. The initial version of the changes to the GUI might be created by the design professional using a design tool such as Figma, Adobe XD, Sketch, or by manually diagramming the GUI experience.

The user experience design would then be reviewed by the design professionals, the product managers responsible for enabling the new feature in the software product, the product architects responsible for designing and including the new feature in the software product, and engineers responsible for actually implementing the GUI from the mockup provided by the design professional. After agreeing on the details of the user experience design, the engineers would implement the user experience design in software to add the user experience design to the software product GUI. The GUI would then be tested to ensure that the new feature of the product is actually accessible via the GUI. Often this process would iterate multiple times from any stage back to the original design phase, which can cause delays in implementing new features in the software product. Additionally, where the new feature is intended to be accessed using multiple different user experience designs, such as by a CLI as well as a GUI, each of the user experience design would need to go through this process.

Moreover, the conventional process of creating user experience designs is a manual process that requires each participant to keep track of the latest version of the user experience design. In an environment where the user experience design is changing frequently, for example due to architecture changes, implementation approach changes, or due to market/customer requirement changes, this may be difficult to implement. For example, the design professionals and product development team may revise a user experience design, but the engineers tasked with implementing the user experience design may be working on an earlier version of the user experience design.

In related U.S. patent application Ser. No. 17/277,542, filed Jan. 18, 2022, entitled Method and Apparatus for Codifying User Experience Designs and Managing the Codified User Experience Designs, an Experience Design Codification and Management System (EDCMS) system is described. The content of U.S. patent application Ser. No. 17/277,542 is hereby incorporated herein by reference.

Specifically, U.S. patent application Ser. No. 17/277,542, describes a method and apparatus that is configured to retrieve a user experience definition 175 based on the user experience design from an external design system 100, and generate a comprehensive user experience specification 180 from the user experience definition 175. Part of the comprehensive user experience specification 180 includes information that describes the graphical aspects of the user experience design, as well as JavaScript Object Notation (JSON), eXtensible Markup Language (XML) or YAML code created based on the finite state machine generated from the user experience definition 175. The EDCMS 195 then packages and encodes the comprehensive user experience specification to create a codified user experience design 185 from the comprehensive user experience specification 180. The codified user experience design 185 is then versioned and digitally signed, and the versioned and signed codified user experience design 190 is stored in a user experience design repository 145.

By automatically generating a codified user experience design 185 from a user experience design 170, it is possible to provide engineers with a codified version of the intended user experience design 170, which includes information specifying the presentation of the user interface on a browser, as well as JSON, XML, YAML, or another code format that encodes the logic associated with states of the user experience design and transitions between states of the user experience design 170 that is to be implemented. This eliminates communication errors that might occur between the design professionals and engineers, because the engineers are automatically provided with a packaged and encoded codified user experience design 185, that is generated from the user experience design 170. By signing and versioning the codified user experience specification 190, and automatically entering the signed and versioned codified user experience 190 in a user experience design repository 145 where it can then be checked out/checked in, as necessary, it is possible to ensure that everyone is working to implement the correct version of user experience design 170. This facilitates collaboration by preventing different members of the design team from working toward implementation of different versions of the user experience design 170.

FIG. 1 is described in greater detail in U.S. patent application Ser. No. 17/277,542, and is a functional block diagram of an example Experience Design Codification and Management System (EDCMS) 195, according to some embodiments. As shown in FIG. 1, in some embodiments design professionals (people) use existing experience design tools 100 to create user experience designs 170. Example existing design tools include design systems $100_1$-$100_n$, which might be for example an online design system tool such as Figma $100_1$, Adobe XD $100_2$, or a Sketch $100_n$. Many external design systems 100 might be used, depending on the implementation. Additionally, in some embodiments, user experience designs may be created manually, i.e., without the help of tools such as Figma or Adobe XD, and then processed by a proxy 105 configured to perform image processing of the manually created design. It should be noted that the design systems $100_1$-$100_n$ are outside of the EDCMS 195, as indicated by the vertical dashed line separating the external design systems 100 from the components of the EDCMS 195.

In some embodiments, the EDCMS 195 includes an experience design intake section configured to interact with the design systems $100_1$-$100_n$, to retrieve user definitions 175 based on the user experience designs 170 that have been created by the design professionals using these external systems 100. For example, in some embodiments the EDCMS 195 includes a set of proxies $105_1$-$105_n$ configured to interact with each respective design system $100_1$-$100_n$. As an example, if the Figma Service (design system $100_1$) enables external access at a particular URL, the Figma proxy $105_1$ may be configured to access the external Figma Service URL, request a design created by a particular design professional or team of design professionals, and then download the requested user experience definition 175. In some embodiments, each proxy operates in a stateless manner, and makes use of publicly available API interfaces for the experience design platforms 100. Although FIG. 1 shows a one-to-one correspondence between proxy 105 and design system 100, it should be understood that in some embodiments a given proxy 105 may be configured to interact with more than one design system 100, or that a single proxy 105 may be used to interact with all of the design systems 100.

According to some embodiments, the EDCMS 195 is configured to require the design professional to include experience metadata 250 (see FIG. 2) describing the intended environment of the software interaction experience.

The experience metadata 250, in some embodiments, includes information about who (the persona 205) the software interaction experience is being designed for. Different types of software users (different personas) might be provided with different software interaction experiences. For example, a system administrator may be given a different set of experiences than a normal user. Other personas might be a data center manager, network manager, software engineer, or other similar title. Personas may also be specified by capturing what the roles do, such as server administrator, storage administrator, backup administrator, filesystem user, auditor, security administrator, etc. In addition to specifying the persona 205, in some embodiments the experience metadata 250 also includes information about when, in the product lifecycle 210, the person specified in the persona metadata 205 is expected to encounter the software interaction experience.

In some embodiments, the experience metadata 250 includes information about the intended outcome of the user experience design 170. An "outcome", as that term is used herein, is used to refer to the objective of the software interaction experience. For example, if the software interaction experience has been created to enable a user to create a storage volume on a storage system, that would be the "outcome" that the design professional would specify in the outcome 215 aspect of the experience metadata 250. Other outcomes might include initial configuration of a system, setting up sub-tenants on a leased storage system, creating and mapping Logical Unit Numbers (LUNS) to hosts, monitoring system behavior, creating custom dashboards, etc. Many possible outcomes exist, although it would also be expected that there would be many similar outcomes that design professionals would create for different software products.

In some embodiments, the experience metadata 250 includes information about the particular mode of consumption 220, i.e., how a user is to be presented with the software interaction experience. Example modes 220 might include a Graphical User Interface (GUI) such as on a browser or on a mobile application, an Application Program Interface (API), a Command Line Interface (CLI), a Continuous Integration/Continuous Delivery (CI/CD) system, or another form or mode of consumption of a user experience.

In some embodiments, the experience metadata 250 includes information about how the experience is achieved. This is the workflow 225 that is used to achieve the intended outcome. For a GUI based user experience design 170, the workflow specifies the human interaction with screen states and transitions between states.

Figure 2:
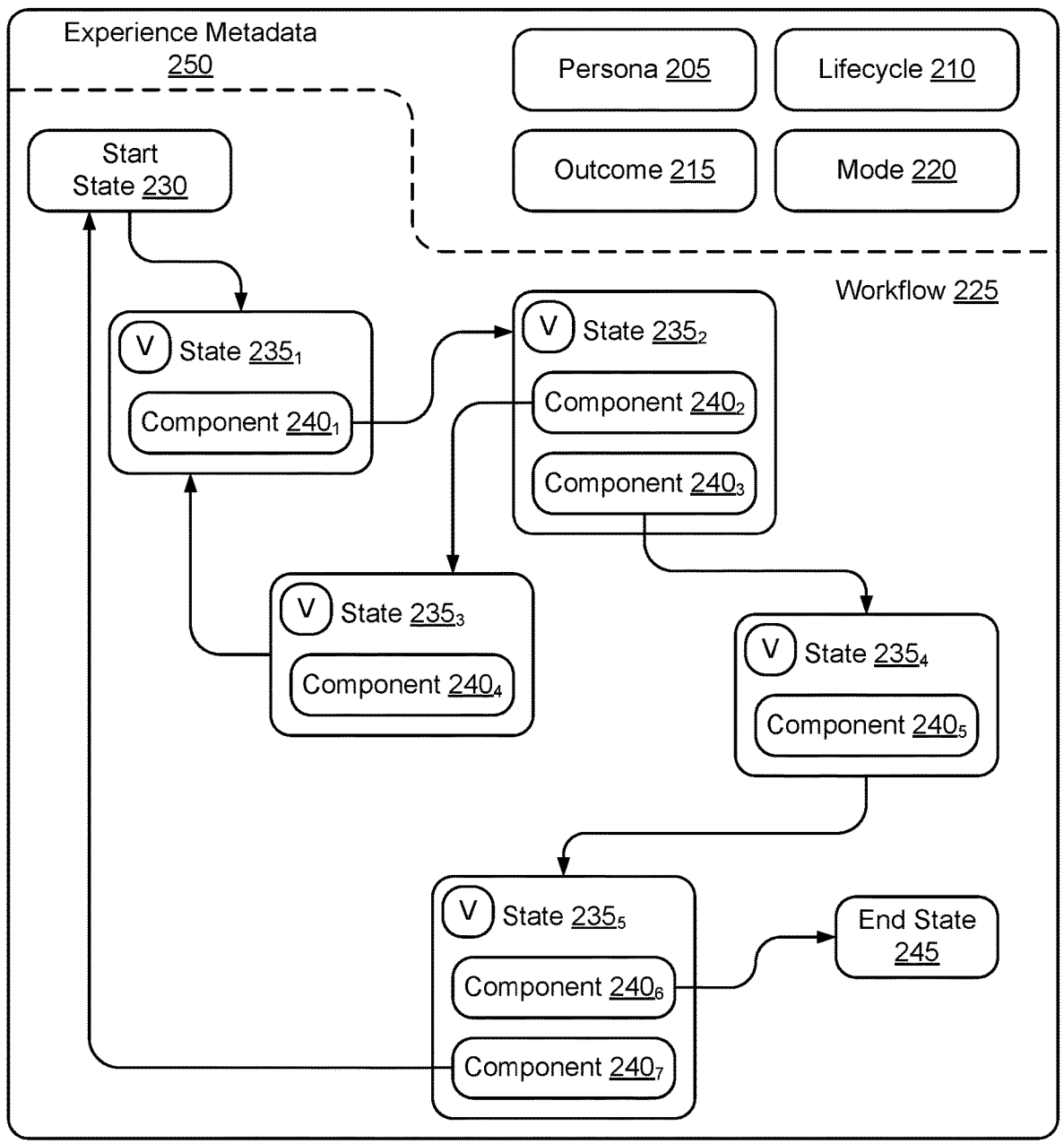
FIG. 2 is a functional block diagram of example experience design metadata, according to some embodiments.

FIG. 2 is a functional block diagram of example experience design metadata 250, according to some embodiments. As shown in FIG. 2, in some embodiments the user experience definition 175 metadata 250 includes the persona 205, lifecycle 210, outcome 215, and mode of consumption 220. In addition, the user experience definition 175 metadata 250 includes workflow metadata 225 specifying a series of states 230, transitions between states, components 240, and variability information (V).

In the example workflow 225 shown in FIG. 2, the workflow metadata 225 specifies a start state 230 and a subsequent transition to state $235_1$. In the context of a GUI, the start state might be encountered when the user starts the software application and state $235_1$ might be displaying an initial screen on the GUI that includes component $240_1$. The workflow metadata 225 specifies that, when the user interacts with component $240_1$, that the experience should transition to state $235_2$ containing components $240_2$ and $240_3$. The workflow metadata 225 further specifies state transitions that occur in connection with each of the components until an end state 245 is reached. In some embodiments, the end state 245 is associated with the outcome 215. Although FIG. 2 shows an example in which the workflow metadata 225 has one end state 245, it should be understood that there may be more than one end state 245, depending on the implementation. It should be understood that the example shown in FIG. 2 is merely one example of an experience design metadata, and it would be expected that different experience designs could vary considerably from the example shown in FIG. 2. Additionally, while FIG. 2 shows the example workflow in the form of a graph, the workflow may also be specified in a textual manner, for example in a plain text language file.

Once the user experience design 170 has been created, the EDCMS 195 accesses and obtains a copy of the user experience design 170 from the design system 100. As used herein, the term "user experience definition 175" is used to refer to a set of one or more files that are associated with the user experience design 170, and which are retrieved by the EDCMS 195 from the external design system 100 after the user experience design 170 has been created on the external design system 100. The particular format of the files which comprise the user experience definition 175 will depend on the syntax used by the external design system 100 to describe the user experience design 170. In some embodiments, when the user experience definition 175 is retrieved by the EDCMS 195, the EDCMS checks for the presence of the required experience metadata 250 and, if any user experience metadata 250 is missing, prompts are generated via user access interface 155 to request that the experience metadata 250 be added to the user experience definition.

In some embodiments, the implementation layer processes the user experience definition 175 to create a comprehensive user experience specification 180. The implementation layer, in some embodiments, includes a persona and outcome mapping and normalization subsystem 110, a finite state machine (FSM) generation subsystem 115, a consistency checking and annotation subsystem 120, a component and style capture subsystem 125, and a specification capture subsystem 130. Although FIG. 1 shows the user experience definition 175 being input to the persona and outcome mapping and normalization subsystem 110, it should be understood that the user experience definition 175 may be simultaneously input to each of the subsystem 110, 115, 120, 125, 130 at the same time. Likewise, although FIG. 1 shows arrows extending between the subsystem 110, 115, 120, 125, 130 from top to bottom, it should be understood that the subsystems may be used in any order, and that the subsystems may process the user experience definition 175 independently, depending on the implementation.

In some embodiments, the outcome mapping and normalization subsystem 110 captures the target persona from persona metadata 205 and the target outcome from outcome metadata 215 and translates the persona 205 and outcome 215 into a standard taxonomy of personas and outcomes. For example, if the target persona specified in persona metadata 205 of the user experience definition 175 was "sys admin", and the standard taxonomy included "system administrator" as one of the standard personas, the outcome mapping and normalization subsystem 110 would change the experience metadata 250 such that the experience metadata 250 in the comprehensive user experience specification 180 referred to the intended persona using the term "system administrator". In some embodiments, the persona and outcome mapping and normalization subsystem 110 uses data and textual analytic techniques to implement the mapping and normalization of persona metadata 205 and outcome metadata 215.

In some embodiments, the finite state machine generation subsystem 115 uses the knowledge of the start state 230, incrementally captures state transition events and actions, incrementally captures the contents of each state, and incrementally captures the variable/invariable nature of each state. In some embodiments, the finite state machine generation subsystem 115 uses the workflow metadata 225 to build a Mealy machine, in which state transitions depend on the current state plus inputs, or a Moore machine, in which state transitions do not depend on the inputs, but only depend on the current state, and produces a formal, intermediate representation of a finite-state machine. In some embodiments, the finite state machine generation subsystem 115 also runs one or more sanity checks on the finite state machine, to ensure that the finite state machine meets a set of pre-requisite properties for experience designs. Example sanity checks might include a set of Boolean rules, such as "before a page loads, x event is required to happen."

The consistency checking and annotation subsystem 120, in some embodiments, determines which elements of the user experience definition 175 are variable, and which are absolutely required, and annotates the comprehensive user experience specification 180 to indicate which elements are able to be varied by the engineers when implementing the comprehensive user experience specification 180. For example, in FIG. 2, each state has a variability V specified, which indicates whether and to what extent the particular state is variable or whether any of the components of the state are variable. An example variability measure may be to specify that the particular color that was selected is variable, such that the component or the state may be adjusted to automatically use one of a standard set of colors. Another example variability measure may be to allow for some latitude as to the particular placement of the component on the interface design. The consistency checking and annotation subsystem 120, in some embodiments, uses this variability information as well as heuristics, to annotate which aspects of the design are variable and by what percentage or other quantity the aspect may be varied in the final user experience. In some embodiments, the consistency checking and annotation subsystem 120 uses the same process to also check the styles of each of the states, to determine whether the styles used in each of the states are variable. Style consistency and annotation can be implemented for each state as well, and can be implemented at the same time as the components are processed by the consistency checking and annotation subsystem 120 or can be processed separately from the components.

The component and style capture subsystem 125, in some embodiments, conducts either a depth-first or breadth-first walk of the finite state machine graph, marking visited states along the way, to identify all components of the finite state machine. The component and style capture subsystem 125 compares the components used in the finite state machine with a store of known components in database 150 and, if a new component is detected that is not contained in the store of known components, adds the new component to the store of known components. In this manner, a store of known components can be incrementally built over time by the EDCMS 195. In some embodiments, the data store of known components is used by the consistency checking and annotation subsystem 120 (described above) when checking components of a user experience definition 175 for consistency with previous versions of the same components. Components in the data store of known components may be indexed, within the namespace of the experience at hand, as well as by its version, signature, and other unique fields, depending on the implementation. In some embodiments, if a component or style in the experience definition matches a known component or style in the data store of known components or styles, the correspondence is noted in the comprehensive user experience specification.

In some embodiments, the EDCMS 195 includes a specification capture engine 130. In some embodiments, this subsystem is configured to convert all parts of the comprehensive user experience specification 180, from the persona and mapping normalization subsystem, the finite state generation subsystem 115, the consistency checking and annotation subsystem 120, and from the component and style capture subsystem 125, into a standard versioned stylized, codified specification. The specification, in some embodiments, is expressed in human-readable and machine-readable languages and includes, for example, HTML, JavaScript, and Cascading Style Sheets that specify the presentation of the user interface on a browser, as well as JSON, XML, YAML, or another code format that encodes the logic associated with states of the user experience design and transitions between states of the user experience design 170 that is to be implemented.

The finite state machine defines states and transitions between states, which are able to be converted to JSON, XML, or YAML to be output in code form as a comprehensive user experience specification 180 for use by engineers to implement the user experience design 170. Annotations may be added to the JSON, XML, or YAML code as comments, to thereby enable all aspects of the user experience definition 175 to be specified in the JSON, XML, or YAML that is used to implement the comprehensive user experience specification 180.

In some embodiment, a package generation and encoding subsystem 135 encodes the comprehensive user experience specification 180 as well as artifacts received from each of the implementation subsystems. In some embodiments, the package generation and encoding subsystem 135 operates in a request/response manner with each of the subsystems 110, 115, 120, 125, 130, to capture partial results and store the partial results in database 150. The package generation and encoding subsystem 135 also packages the comprehensive user experience specification 180 to enable all aspects of the comprehensive user experience specification 180 to be included in the codified user experience design 185.

In some embodiments a signature marking and versioning subsystem 140 receives the comprehensive user experience specification 180 and signs and versions the comprehensive user experience to create a versioned and signed codified experience specification. In some embodiments, the signature is implemented using a hash to create a digital signature that is virtually guaranteed to be universally unique. An example hash might be implemented, for example, using a Secure Hash Algorithm such as SHA-256, which creates a 32-byte hash signature. Other hash algorithms may similarly be used, depending on the implementation. In some embodiments the versioning process assigns a version number to the versioned and signed codified experience specification 190 to enable each version of a given user experience design to be specifically identified. Example version number might be 1.1, 1.2, 1.2.1, etc., depending on the implementation. In some embodiments, the user is prompted to provide input as to how the user experience design should be versioned. The package, its signature, and its version identifier, constitute a unique artifact for a particular experience design. Any future change to the design will result in a new signature and a new version number, to enable all versions of the user experience design to be uniquely identified within the user experience design repository 145.

Figure 3:
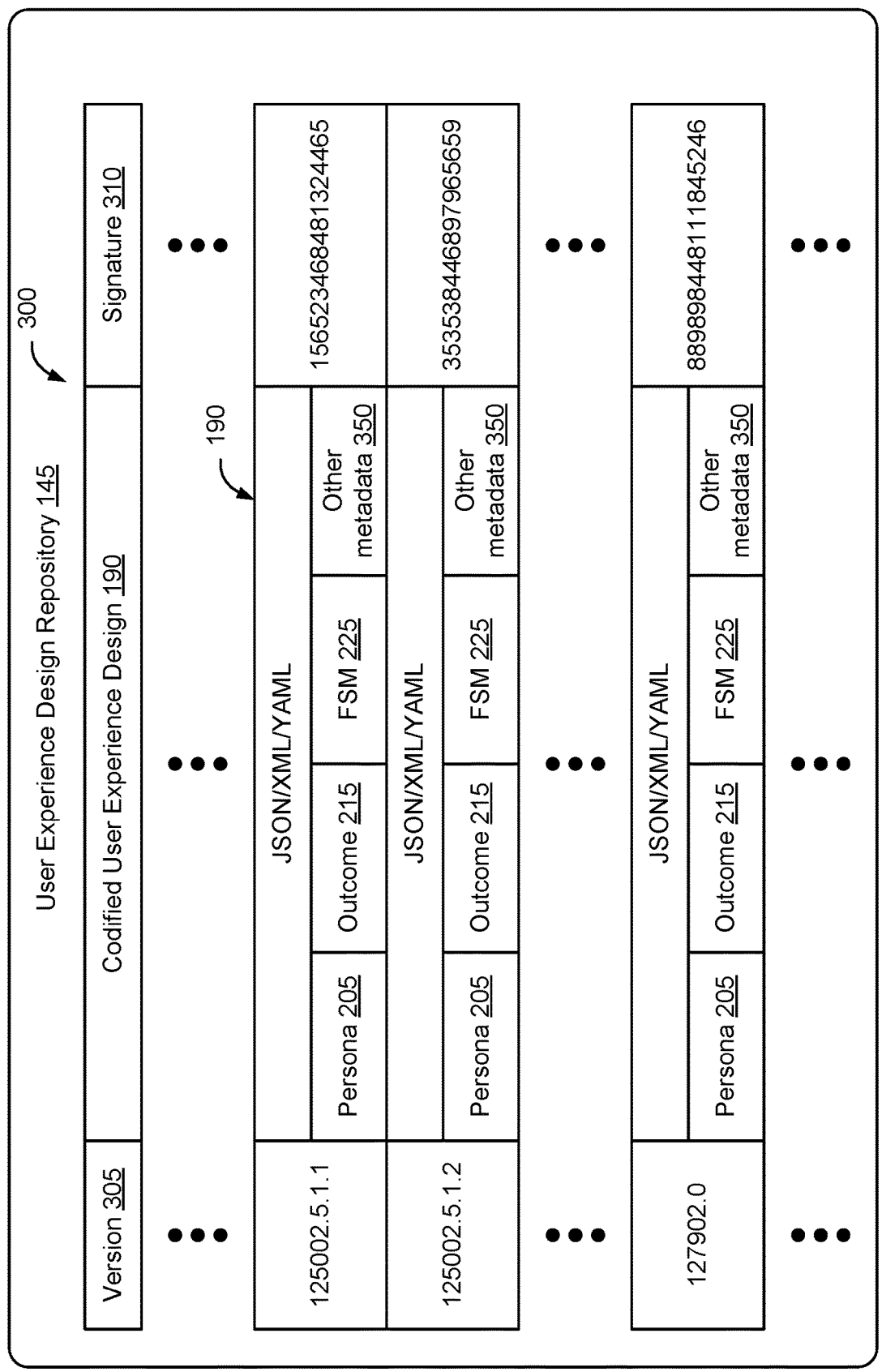
FIG. 3 is a functional block diagram of an example data structure configured to implement a codified user experience design repository of the EDCMS of FIG. 1, according to some embodiments.

Codified user experience designs 190, in some embodiments, are stored in a user experience design repository 145. FIG. 3 is a functional block diagram of an example data structure configured to implement a user experience design repository 145 of the EDCMS of FIG. 1, according to some embodiments. As shown in FIG. 3, in some embodiments the user experience design repository 145 includes a data structure 300 having entries containing versioned and signed codified experience specifications 190. Each entry has a version number 305 that uniquely identifies the experience specification 190 and a signature 310 that is able to be used to verify the content of the experience specification 190. The user experience specification includes the experience metadata 225, such as persona 205, outcome 214, finite state machine 224, annotations, and the other experience metadata described in connection with FIG. 2. The user experience specification also includes the information that specifies the presentation of the user interface on a browser, as well as JSON, XML, YAML, or another code format that encodes the logic associated with states of the user experience design and transitions between states of the user experience design 170 that is to be implemented.

In some embodiments, the user experience design repository 145 is able to be searched, for example to identify codified user experience designs 190 that have particular personas, outcomes, or that have finite state machines that have particular properties, to enable previous designs with particular attributes to be identified and selected.

According to some embodiments, a method and apparatus for using existing codified user experience designs to complete partially constructed user experience designs and to create new user experience designs is provided.

If a partially completed user experience design is entered into the EDCMS, the persona and outcome of the partially completed user experience design are read and used to identify a subset of previous codified user experience designs that have similar personas and outcomes. A user experience design may be designated to the EDCMS as partially completed, for example by tagging the user experience design with a Work In Progress (WIP) tag or another type of indicator.

The EDCMS uses the persona and outcome of the WIP user experience design to search the user experience design repository 145 for one or more previous codified user experience designs with similar personas and outcomes. One of the previous codified and versioned user experience designs is selected and used to complete the partially constructed user experience design. In some embodiments, a Finite State Machine (FSM) of the WIP user experience design and an FSM of the previous codified user experience design are walked to determine parts of the two FSMs that are similar. Persona based heuristics are used to determine replacement rules for the FSM to determine which portions of the FSM of the WIP user experience design should be replaced with portions of the FSM from the previous codified user experience design. When a portion of the FSM of the WIP user experience design is replaced with a portion of the FSM from the previous codified user experience design, the existing components and styles of the selected portion of the FSM from the previous codified user experience design are replaced with components and styles of the WIP user experience design, to enable the entire FSM of the WIP user experience design to have consistent components and styles.

For example, in connection with creating a user experience design, a designer designs a critical subset of the user experience design, enters the persona and outcome metadata into the design, tags the user experience design as a Work in Progress (WIP), and enters the WIP user experience design into the EDCMS. The EDCMS has no prior history/artifacts for this particular outcome. However, the EDCMS repository contains a set of related codified user experience designs for related outcomes for the same or similar personas. By selecting one of the related codified and versioned user experience designs with a finite state machine that was created to achieve a related outcome for the same or similar persona, it is possible to leverage the previous design to complete the WIP user experience design by allowing reuse of some of the workflow that was created for the previous codified user experience design.

As an example, assume that a new user experience design is being created that will enable configuration of RSA SecureID for Multi-Factor Authentication (MFA). This outcome has not been previously implemented and, as such, the user experience design repository 145 does not have a previously codified user experience design for this outcome. However, in this example it is assumed that a user experience design had previously been created and entered into the EDCMS that enables configuration of an Identity Provider (IdP) for Single Sign On. Since the outcome of this previous codified user experience design is similar to the outcome of the WIP user experience design (configuring a third-party server in this example), the EDCMS can use this previous codified user experience design to suggest portions of the workflow (Finite State Machine) that should be used to complete the FSM of the WIP user experience design.

As another example, assume that a new user experience design is being created that will enable job monitoring on block storage. This outcome has not been previously implemented and, as such, the user experience design repository does not have a previously codified user experience design for this outcome. However, in this example it is assumed that a user experience design had previously been created and entered into the EDCMS that enables job monitoring for data protection. Since the outcome of this previous codified user experience design is similar to the outcome of the WIP user experience design, the EDCMS can use this previous codified user experience design to suggest portions of the workflow (Finite State Machine) that should be used to complete the FSM of the WIP user experience design.

Figure 4:
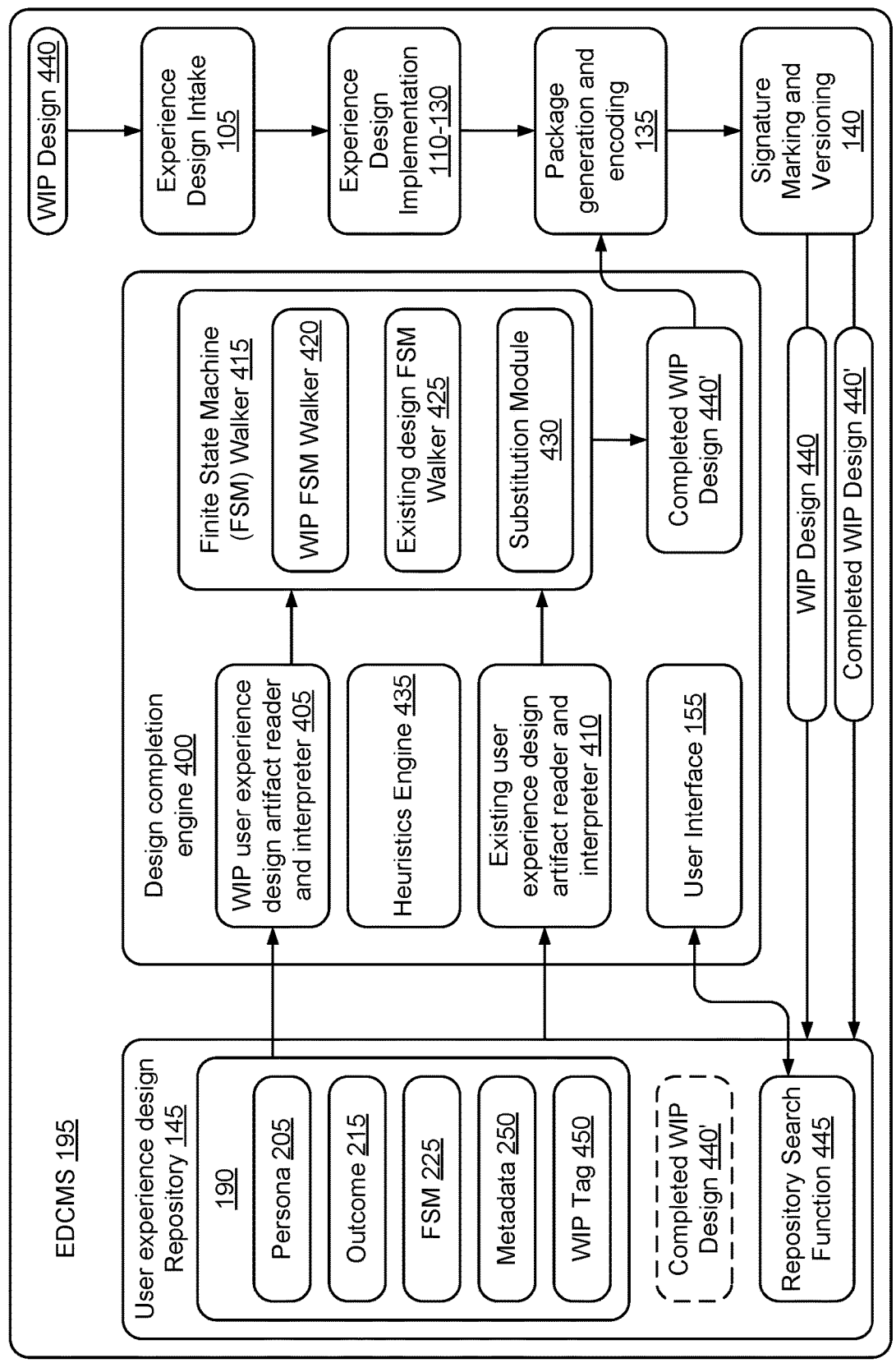
FIG. 4 is a functional block diagram of an example EDCMS system configured to use previously codified user experience designs to complete partially constructed user experience designs, according to some embodiments.

FIG. 4 is a functional block diagram of an example EDCMS system 195 configured to use previously codified user experience designs to complete partially constructed user experience designs, according to some embodiments. As shown in FIG. 4, in some embodiments the EDCMS is used to create codified user experience designs 190 that are stored in a user experience design repository 145. As discussed above in connection with FIG. 1, in some embodiments the EDCMS system 195 includes an experience design intake subsystem 105, an experience design implementation subsystem including components 110-130 described in connection with FIG. 1, a package generation and encoding subsystem 135, and a signature marking and versioning subsystem 140. The EDCMS system 195 also includes a user experience design repository 145.

According to some embodiments, the EDCMS 195 includes a design completion engine 400 configured to enable partially constructed user experience designs to be completed using one or more previously completed codified and versioned user experience designs 190 selected from the user experience design repository 145. When a user experience design is entered into the EDCMS, the experience design intake subsystem 105 or experience design implementation subsystem 110-130 scans the user experience design specification to determine if a WIP tag 450 has been added to the user experience design. Although some embodiments will be described in which the user experience designs are tagged with a WIP tag 450, other ways of identifying a user experience design as being not fully completed may be used as well. A partially completed user experience design, such as a user experience design that has been tagged with a WIP tag, will be referred to herein as a "WIP user experience design 440".

In some embodiments, when the EDCMS receives a WIP user experience design 440, the WIP user experience design 440 is sent through the normal processing steps described above in connection with FIGS. 1-3. Specifically, the WIP user experience design 440 is received by the experience design intake subsystem 105, processed by the experience design implementation subsystems 110-130, packaged by the package generating and encoding subsystem 135, versioned by the versioning subsystem 140, and sent to the user experience design repository 145. Processing the WIP user experience design 440 by the experience design implementation subsystem 110-130 enables the persona 205 and outcome 215 of the WIP design to be normalized, and also allows a partial FSM 225 for the WIP user experience design 440 to be built. Building a partial FSM 225 for the WIP user experience design 440 enables the design completion engine 400 to use the partial FSM 225 and augment the partial FSM 225 using portions of the FSM of a selected previous codified and versioned user experience design. Accordingly, building a partial FSM for the WIP user experience design, enables the one or more selected previous codified and versioned user experience designs to be used to complete the WIP user experience design 440, resulting in creation of a completed WIP user experience design 440'.

After the WIP design has been entered in the user experience design repository 145, if a determination is made to complete the WIP design, the WIP design is read into the design completion engine 400 of the EDCMS 195. In some embodiments, the design completion engine 400 has a WIP artifact reader and interpreter 405. The WIP artifact reader and interpreter 405 reads the artifacts of the WIP user experience design 440 from the user experience design repository 145 and makes a copy of the WIP user experience design 440. By making a copy of the WIP user experience design 440, the original codified WIP user experience design 440 is retained in the user experience design repository 145. This allows the WIP user experience design 440 to be processed multiple times by the design completion engine, if necessary, for example using different previous codified user experience designs 190.

Based on the artifacts that were read from the WIP user experience design 440, such as the persona and outcome, a previous codified and versioned user experience design 190 is selected. One example way of selecting a previous codified and versioned user experience design 190 is described below in connection with FIG. 5. In some embodiments the user experience design repository 145 has a repository search function 445 that enables the previous codified user experience designs to be searched, for example using the metadata contained in the previous codified user experience designs 190.

Once a previous codified and versioned user experience design 190 has been selected, an existing design artifact reader and interpreter 410 reads the artifacts of the existing user experience design from the user experience design repository 145 and makes a copy of the existing codified user experience design 190. By making a copy of the existing codified user experience design 190, the original existing codified user experience design 190 is retained in the user experience design repository 145.

The design completion engine includes a Finite State Machine (FSM) walker 415. In some embodiments, the FSM walker 415 has a WIP FSM walker 420 configured to walk the partial FSM of the WIP user experience design 440, and has a corresponding existing design FSM walker 425 configured to walk the corresponding FSM of the selected existing codified and versioned user experience design 190. The finite state machine walker 415 uses these two FSM walkers 420, 425, to compare the FSM of the WIP user experience design 440 with the FSM of the selected previous codified and versioned user experience design.

In some embodiments, a heuristics engine is used by the FSM walker to compare the portions of the FSMs. The heuristics engine, in some embodiments, contains a set of similarity tests that are used to determine whether portions of the FSMs are similar. The rules of the heuristics engine enable portions of the FSMs to be compared not only based on similarities of states and state transfers, but also based on the similarities of persona, annotations, labels, and the use of similar components. Applying the heuristics rules, the finite state machine walker 415 identifies parts of the FSM of the selected previous codified and versioned user experience design 190 that could be added to the FSM of the WIP design or that could be possible candidates for substitution of a portion of the FSM of the WIP user experience design 440.

Example heuristics might include, for example, a rule that specifies that prior to taking a particular action, a person is first required to log into the system. Based on this heuristic, if the FSM of the WIP user experience design 440 contains a portion that is related to taking that particular action, the heuristics engine will suggest that the FSM of the WIP user experience design 440 be augmented by including a portion of the FSM from the existing codified user experience design 190 that relates to having the person first log into the system. Tags and labels (e.g., annotations) in the existing codified user experience design 190 can be used to pick and choose pieces of the FSM of the existing codified user experience design 190 that should be added to the FSM of the WIP user experience design 440 to complete the FSM of the WIP user experience design 440.

When a possible portion of the FSM of the selected previous codified and versioned user experience design is located for inclusion into the FSM of the WIP user experience design 440, a prompt is provided to the design professional via the user interface 155, to enable the design professional to approve use of the identified portion of the FSM from the selected previous codified and versioned user experience design in the FSM of the WIP user experience design 440. Providing prompts via the user interface 155 enables a design professional to have continued control over creation of the FSM of the WIP user experience design 440, while simplifying the overall design process by having suitable FSM segments identified and suggested to thereby accelerate creation of the WIP user experience design 440. By walking the design professional through the parts of the FSM that need to be completed, and guiding the design professional visually by providing substitution options selected from existing codified user experience design 190, it is possible to reduce the amount of effort required to complete a partially completed user experience design.

If approved, a substitution module 430 of the FSM walker 415 substitutes the portion of the FSM of the selected previous codified and versioned user experience design into the FSM of the WIP user experience design 440.

To enable the WIP user experience design 440 to have consistent components and throughout the user experience design, the components and styles of the WIP user experience design are applied to the portions of the FSM of the WIP design that were created based on the FSM of the selected previous codified and versioned user experience design, so that all of the components and styles of the completed the WIP user experience design 440' are consistent.

Figure 5:
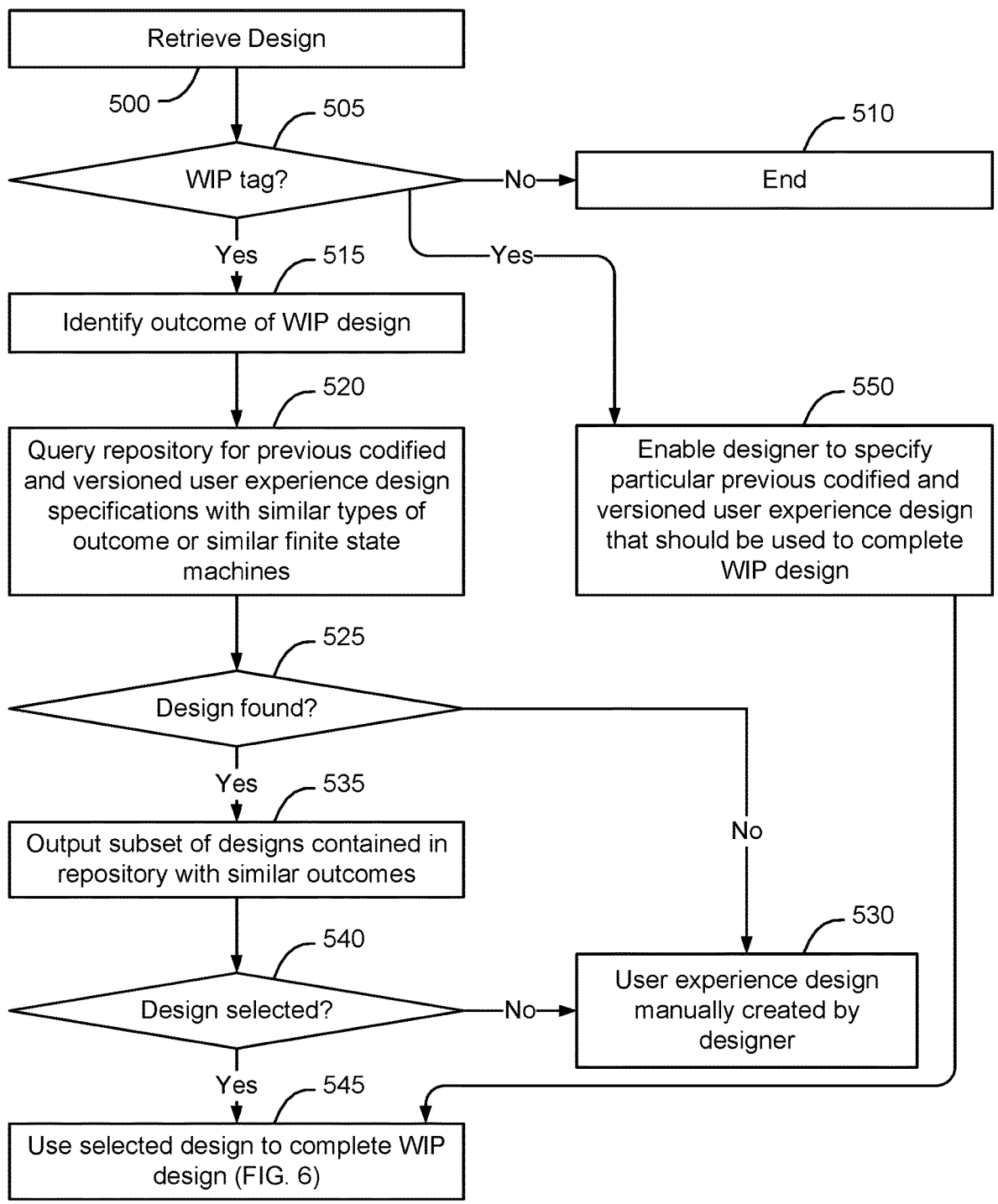
FIG. 5 is a flow chart of an example process of selecting an existing codified and versioned user experience design to be used in connection with completing a partially constructed user experience design, according to some embodiments.

FIG. 5 is a flow chart of an example process of selecting an existing codified and versioned user experience design 190 to be used in connection with completing a partially constructed user experience design, according to some embodiments. If a user experience design is to be processed by the design completion engine 400, the user experience design is retrieved from the user experience design repository 145 (block 500). The EDCMS 195 determines if the retrieved user experience design contains a WIP tag (block 505). If there is no WIP tag (a determination of NO at block 505), the retrieved design is not a WIP user experience design, and the process ends (block 510).

If the EDCMS 195 determines that the design contains a WIP tag (a determination of YES at block 505), the metadata of the WIP user experience design 440 is read by the WIP artifact reader and interpreter 405 of the design completion engine 400 to identify the persona and outcome of the WIP user experience design 440 (block 515). In connection with this, often a WIP user experience design 440 will be designed for a new outcome for a persona. If the EDCMS 195 does not have prior history/artifacts for the new outcome, the ECDMS 195 will query the repository for previous codified user experience design specifications with similar outcomes (block 520).

The query is forwarded to the repository search function 445 and, if one or more previous user experience designs are located in the user experience repository 145 (a determination of YES at block 525) a subset of designs contained in the repository with similar outcomes are output on the user interface 155 (block 535). Providing the design professional with a selection of previous codified and versioned user experience designs enables the design professional to select one or more of the previous codified and versioned user experience designs to be used to complete the WIP user experience design 440. Optionally, in block 535 the design professional may be provided with access to the actual user experience design to enable the design professional to navigate through the various screens of the selection of previous codified and versioned user experience user experience designs to determine which of the previous codified and versioned user experience designs is likely to be most relevant when completing the WIP user experience design 440.

Figure 6:
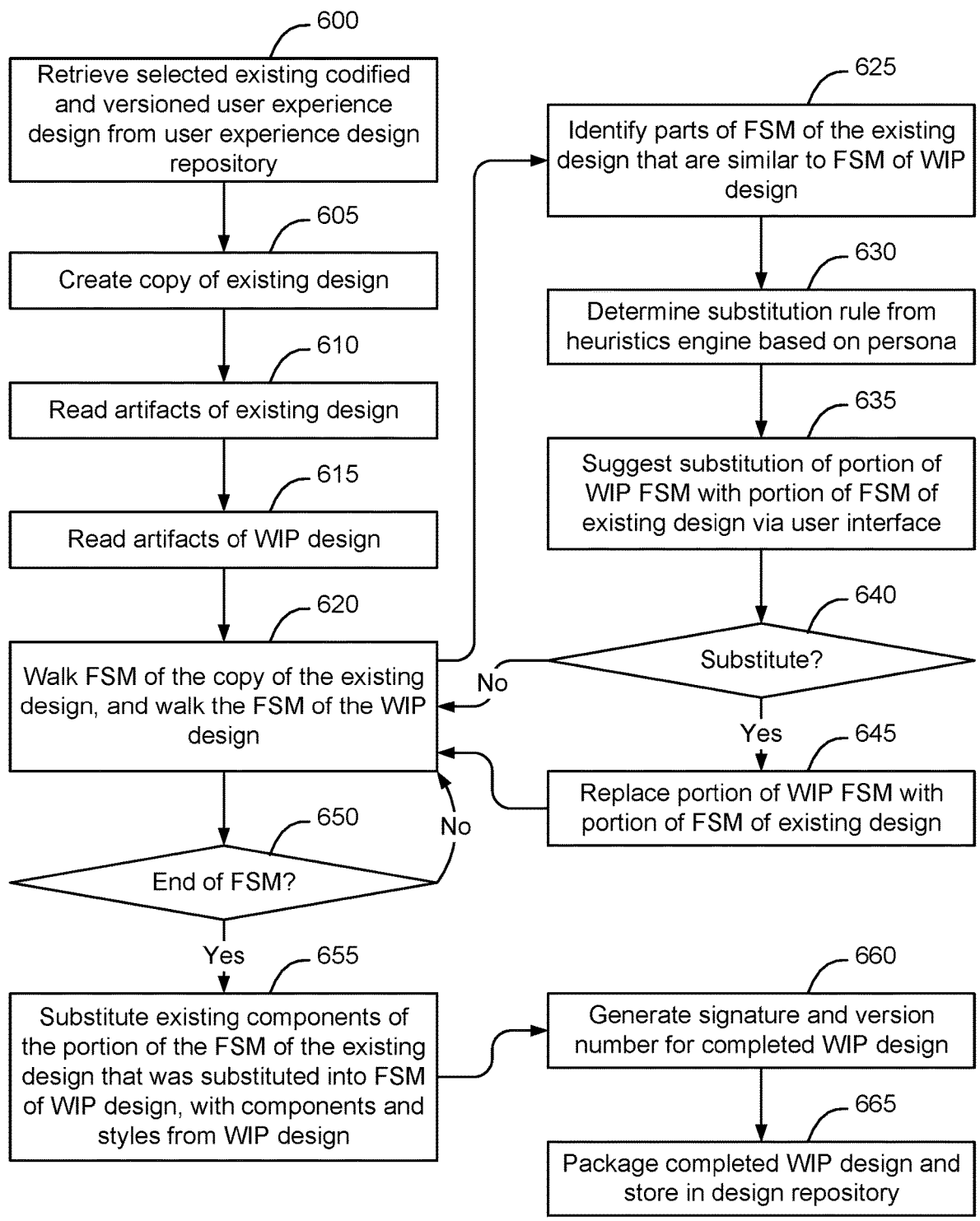
FIG. 6 is a flow chart of an example process of using a selected previous codified and versioned user experience designs to complete a partially constructed user experience design, according to some embodiments.

If an existing codified and versioned user experience design 190 is selected (a determination of YES at block 540), the selected previous codified and versioned user experience design is used to complete the WIP user experience design (block 545) and the process continues to FIG. 6. If a suitable existing codified and versioned user experience design 190 was not able to be found in the experience design repository 145 (a determination of NO at block 525) or if the design professional doesn't select one of the suggested previous codified and versioned user experience designs (a determination of NO at block 540) the design completion engine 400 is not able to be used to complete the FSM of the WIP user experience design 440, and the user experience design will need to be manually created by the design professional (block 530).

Optionally, as shown in FIG. 5, in some embodiments the designer is allowed to specify a particular previous codified user experience design that should be used to complete WIP user experience design 440, in addition to or instead of querying the user experience design repository (block 550). A design professional might want to complete a particular WIP user experience design 440 using a particular existing codified user experience design 190. By enabling the design professional to specify the particular existing codified user experience design 190, the design completion engine 400 is able to enable this to occur, thus providing the design professional with the ability to shortcut the query/selection process of blocks 520-540.

FIG. 6 is a flow chart of an example process of using a selected previous codified and versioned user experience designs to complete a partially constructed user experience design, according to some embodiments. As shown in FIG. 6, in some embodiments a selected existing user experience design 190 is retrieved (block 600) and a copy of the codified and versioned existing design is created (block 605). Creating a copy of the codified and versioned existing design enables the existing codified and versioned design to be retained in the user experience design repository 145 and used for other purposes. The design completion engine 400 reads the artifacts of the existing codified and versioned user experience design (block 610) and reads the artifacts of the WIP design (block 615).

The Finite State Machine (FSM) walker 415 then walks the FSM of the copy of the existing codified and versioned user experience design and walks the FSM of the WIP design (block 620). The FSM walker 415 identifies parts of the FSM of the existing codified and versioned user experience design that are similar to the FSM of the WIP design (block 625) and determines replacement rules from the heuristics engine based on the persona (block 630). The FSM walker 415 suggests replacement of portions of the WIP FSM with portions of the FSM of the existing codified and versioned user experience design via the user interface 155 (block 635).

If a determination is made to replace a portion of the WIP FSM (a determination of YES at block 640), the substitution module 430 substitutes a portion of the WIP FSM with a portion of the FSM of the existing codified and versioned user experience design (block 645).

After substituting the selected portion of the WIP FSM, the process returns to continue walking the FSM of the WIP design and the FSM of the existing codified and versioned user experience design (block 620). Likewise, if a determination is made to not substitute the portion of the WIP FSM (a determination of NO at block 640) the FSM walker continues to walk the FSM of the selected existing codified and versioned user experience design and the FSM of the WIP design (block 620). While walking the design, checks are made to determine if the FSM walker 415 has reached the end of the FSM of the existing codified and versioned user experience design and or the end of the FSM of the WIP design (block 650). This process iterates until the end of the FSM is reached (a determination of YES at block 650).

The components of the portion of the FSM that were added to the WIP FSM from the existing codified and versioned user experience design, are then replaced with components and styles from the WIP design (block 655). This enables WIP design to have consistent component patterns and styles. For example, if the graphical elements of the WIP design were predominantly blue, and the graphical elements of the selected portion of the existing codified and versioned user experience design were predominantly purple, substituting a portion of the WIP FSM with a portion of the FSM from the existing codified and versioned user experience design would cause the WIP design to have a mixture of blue and purple graphical elements. By replacing the graphical elements of the selected portion of the FSM from the existing codified and versioned user experience design with components from the WIP design that are predominantly blue will enable the WIP design to have a consistent visual appearance (all blue). Doing this automatically in block 655 reduces the amount of work required of the designer, by enabling the design completion engine to automatically adapt the portions of the FSM that are added to the WIP FSM to conform with the previously specified component and styles of the WIP design.

Once processing of the WIP design is complete, the completed WIP design 440' is output to be packaged by the package generation and encoding subsystem 135 (block 660), signed and versioned by the signature marking and versioning subsystem 140 (block 665), and then the completed WIP design 440' is stored in the user experience design repository 145.

Although FIG. 6 has been described in connection with processing a WIP design using a single selected existing codified and versioned user experience design 190, it should be understood that the process shown in FIGS. 5-6 may be iterated on a given WIP design. For example, a first existing codified and versioned user experience design 190 may be selected and used to add a first FSM subset to the WIP FSM, and after adding the first FSM subset, the WIP design may be placed back in the user experience design repository 145. The WIP design may then be retrieved a second time, and a second existing codified and versioned user experience design 190 may be used to add a second FSM subset to the WIP FSM. In this manner, the WIP FSM may be built incrementally from more than one previous existing codified and versioned user experience design 190.

Figure 7:
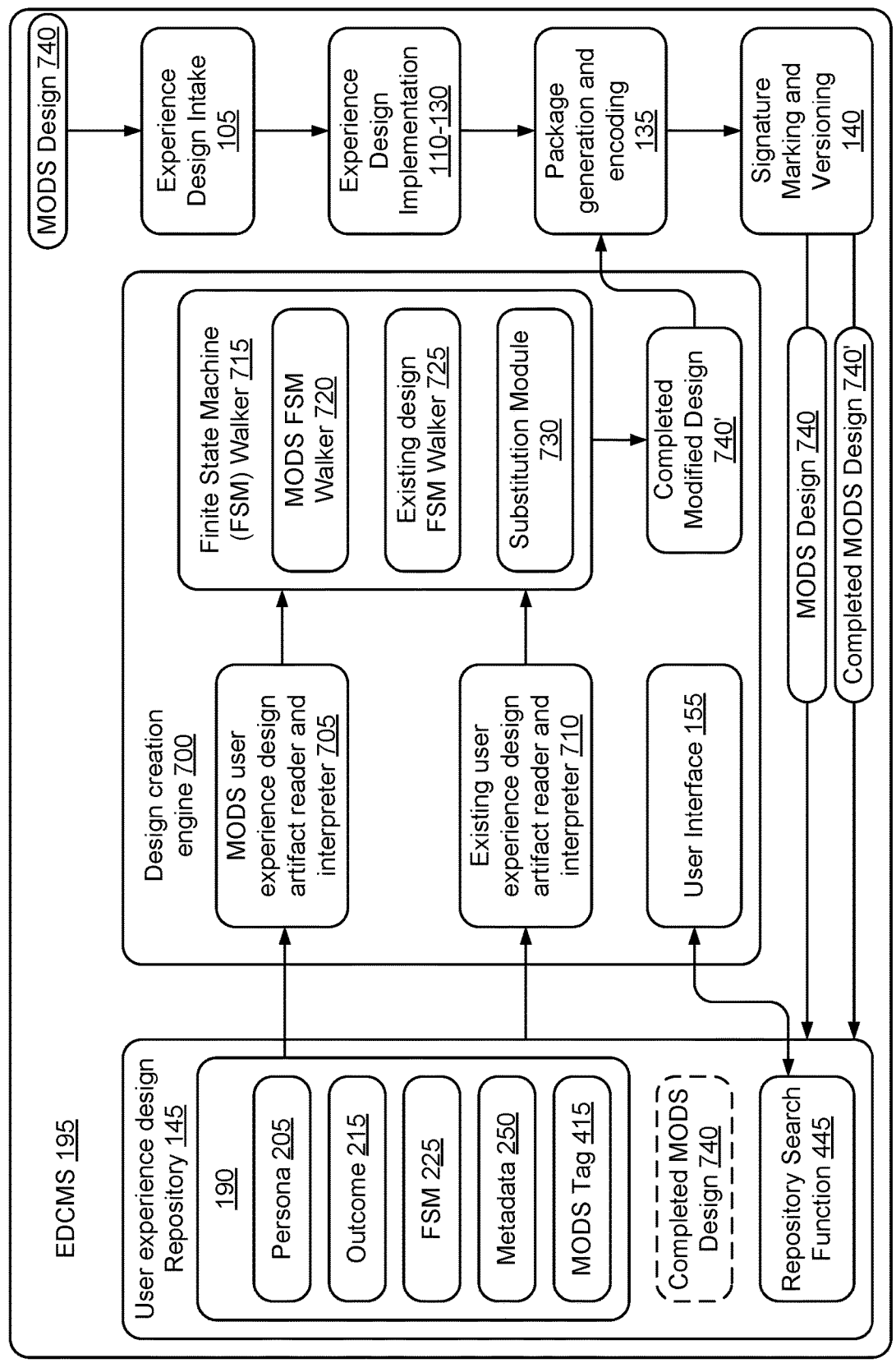
FIG. 7 is a functional block diagram of an example system configured to modify a previously codified user experience designs to create new user experience designs, according to some embodiments.

FIG. 7 is a functional block diagram of an example system configured to modify a previously codified and versioned user experience design to create new user experience designs, according to some embodiments. Creating new designs from previously created codified and versioned user experience designs may be beneficial, for example, where a designer is seeking to take an existing codified and versioned user experience design 190, that was created for a given persona and outcome, and update the existing codified and versioned user experience design 190 for example to add functionality to the existing codified and versioned user experience design 190 or to change or substitute a pattern that is used in the existing codified and versioned user experience design 190.

For example, assume that an existing codified and versioned user experience design 190 has been created with components that have a first dominant shape are primarily colored blue, but that a new pattern has been developed that has components that are somewhat differently shaped and primarily colored purple, and that the new pattern needs to be applied to all pages of the existing codified and versioned user experience design 190.

In some embodiments, the EDCMS 195 includes a design creation engine 700 that will enable a new user experience design to be created from a previous codified and versioned user experience design 190. The designer creates a user experience design containing a new pattern, tags the user experience design with a "modification" tag, referred to herein as a MODS tag, and enters the MODS user experience design in the EDCMS 195. The EDCMS reads the MODS tag and matches the persona and outcome of the new user experience design against previous existing codified and versioned user experience designs 190 for the same persona, outcome, and other state component annotations. The designer selects one of the existing codified and versioned user experience designs 190, and a copy of the selected existing codified and versioned user experience design 190 is then updated using the new pattern, by automatically applying the new pattern to the pages of the existing codified user experience design 190.

As another example, assume that an existing codified and versioned user experience design 190 has been created and entered into the EDCMS 195 that is designed to support a single sign-on configuration process. The next version of the design is required to add the OpenID Connect (OIDC) protocol to this existing codified and versioned user experience design. Largely, the new version should have the same workflows, except for the need to add support to configure the new OIDC protocol. Since the EDCMS 195 has precisely defined tags and annotations with respect to the persona and the outcome, and the pre and post config workflows, the existing codified and versioned user experience design 190 can be located and used to create a future version of this existing codified and versioned user experience design with minimal changes.

As shown in FIG. 7, in some embodiments, when a designer would like to modify an existing codified and versioned user experience design 190, the designer creates a MODS design that is entered into the EDCMS through the experience design intake process 105. The MODS design contains, at a minimum, a MODS tag identifying the design as being intended to be used in connection with modification of an existing codified and versioned user experience design, and an intended persona and outcome of the MODS design, to enable the EDCMS to identify relevant previous codified and versioned user experience designs contained in the user experience design repository. Optionally, if the designer knows the identity of the previous codified and versioned user experience design that the designer would like to modify, the MODS tag may identify the previous experience design, for example by version number. The MODS design also contains any portions of an FSM that should be added to the FSM of the previous codified and versioned user experience design.

The EDCMS searches the user experience design repository 145 for an existing codified and versioned user experience design that matches the specified search criteria. Where the search criteria includes the version number of the previous codified and versioned user experience design, the EDCMS selects the previous existing codified and versioned user experience design with the identified version number. Where the search criteria includes the persona and outcome, the EDCMS presents the designer with a list of existing codified and versioned user experience designs to enable the designer to select an existing codified and versioned user experience design to be used as a basis for the new design.

The EDCMS 195, in some embodiments, has a design creation engine 700 configured to use the MODS user experience design to create a new user experience design based on a previous existing codified and versioned user experience design 190. In some embodiments, the design creation engine 700 includes a MODS user experience design artifact reader and interpreter 705, which is configured to create a copy of the MODS design and read the artifacts of the MODS design. The design creation engine 700 also includes an existing user experience design artifact reader and interpreter 710, which is configured to create a copy of the existing codified and versioned user experience design, read the artifacts of the existing codified and versioned user experience design, and create a new version instance of the existing codified and versioned user experience design.

The design creation engine 700 has a Finite State Machine (FSM) walker 715 that has an existing design FSM walker 725 configured to walk the FSM of the new version of the existing codified and versioned user experience design and a MODS FSM walker 720 configured to walk the FSM of the MODS design. It should be noted that in some instances the MODS design might not have an FSM, for example in instances where a new pattern is to be applied to an existing codified and versioned user experience design without modifying the function or outcome of the previously codified and versioned user experience design.

The existing design FSM walker 725 and MODS FSM walker 720 identify states, state transitions, and other components that are encountered while walking the FSMs of the two designs to a substitution module 730. Based on similarities of persona, annotations, and labels, the substitution module 730 identifies parts of the FSM of the new version of the existing codified and versioned user experience design that could be suitable candidates for substitution or expansion. If the MODS user experience design is intended to add new functionality to the new version of the existing codified and versioned user experience design, the identified portion of the MODS FSM related to the new functionality is added to the FSM of the new version of the existing codified and versioned user experience design by the substitution module 730. If the MODS user experience design is intended to replace a portion of the functionality of the new version of the existing codified and versioned user experience design, the portion of the MODS FSM related to that functionality is substituted into the FSM of the new version of the existing codified and versioned user experience design by the substitution module 730.

The substitution module 730 also includes any newly added components and styles from the MODS design into the new version of the existing codified and versioned user experience design. For example, if the shape of the a button has changed from rectangle with square corners, to a rectangle with rounded corners, the substitution module 730 will take the shape of the component from the MODS design, and automatically apply the component to each page of the copy of the codified and versioned user experience design such that all components have a consistent shape and style throughout the user experience design.

Once completed, the modified version of the existing design 740' is output to the package generation and encoding subsystem 135, passed through the signature marking and versioning subsystem 140, and entered into the user experience design repository 145.

Figure 8:
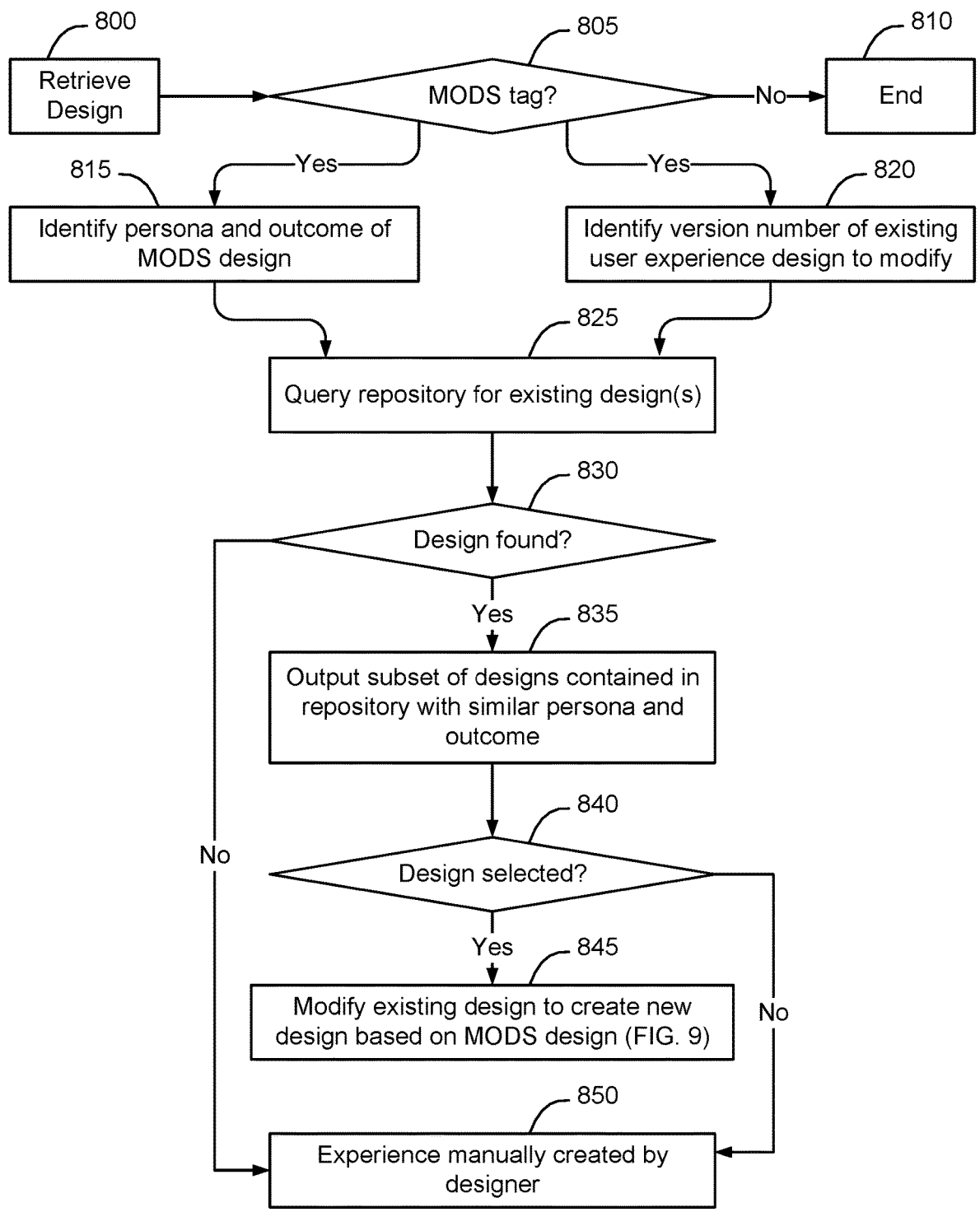
FIG. 8 is a flow chart of an example process of selecting an existing codified and versioned user experience design to be modified to create a new user experience design, according to some embodiments.

FIG. 8 is a flow chart of an example process of selecting an existing codified and versioned user experience design to be modified to create a new user experience design, according to some embodiments. As shown in FIG. 8, initially a designer will create a MODS user experience design containing persona and outcome metadata, and any new aspects of the FSM that are to be added to the FSM of an existing design.

The MODS design 740 is entered into the EDCMS 190, codified, and stored in the user experience design repository 145. At this point, the MODS design may have as much or as little information as desired, depending on how much information was entered by the design professional in addition to the persona and outcome metadata. If the MODS design is selected to be processed by the design creation engine 700 the EDCMS 195 will retrieve the MODS design (block 800) and determine whether the design contains a MODS tag (block 805). If the user experience design that was entered into the EDCMS does not include a MODS tag (a determination of NO at block 805) the design is entered in the EDCMS as a normal user experience design and the process ends (block 810).

If the user experience design contains a MODS tag, the MODS design is passed to the design creation engine 700 that reads the persona and outcome metadata from the MODS design and any other available search criteria that can be used to identify related existing codified and versioned user experience designs 190 in the user experience design repository 145. Example additional search criteria can include identifying characteristics such as any state and components annotations (block 815). Example search criteria can also include an identified version number of an existing codified and versioned user experience design that should form the basis of the design that is to be created (block 820).

The design creation engine 700 uses the search criteria to query the user experience design repository 145 (block 825). If an existing codified and versioned user experience design is not found (a determination of NO at block 830), the design creation engine 700 is not able to create a new design based on a previous codified and versioned user experience design, and the user experience design will need to be created manually (block 850). If one or more previous existing codified and versioned user experience designs are identified by the design creation engine 700 using the search criteria (a determination of YES at block 830), the design creation engine 700 will output a subset of the existing codified and versioned user experience designs to the design professional via the user interface 155 (block 835). The design professional is thus presented with the ability to select one of the existing codified and versioned user experience designs that should be copied and modified to create a new user experience design (block 840). If none of the existing codified and versioned user experience designs are selected (a determination of NO at block 840, the user experience design will need to be manually created (block 850). If one of the existing codified and versioned user experience designs is selected (a determination of YES at block 840), the selected existing codified and versioned user experience design is used as the basis for creation of a new design (block 845) and the process continues at FIG. 9.

Although FIG. 8 shows the process terminating (block 850) if a previous codified and versioned user experience design is not located (a determination of NO at block 830) or if a previous codified and versioned user experience design is not selected (a determination of NO at block 840), in some embodiments the design professional is allowed to enter additional search criteria to iteratively search the user experience design repository 145 (block 825) until a suitable existing codified and versioned user experience design is located and selected (a determination of YES at block 830).

Figure 9:
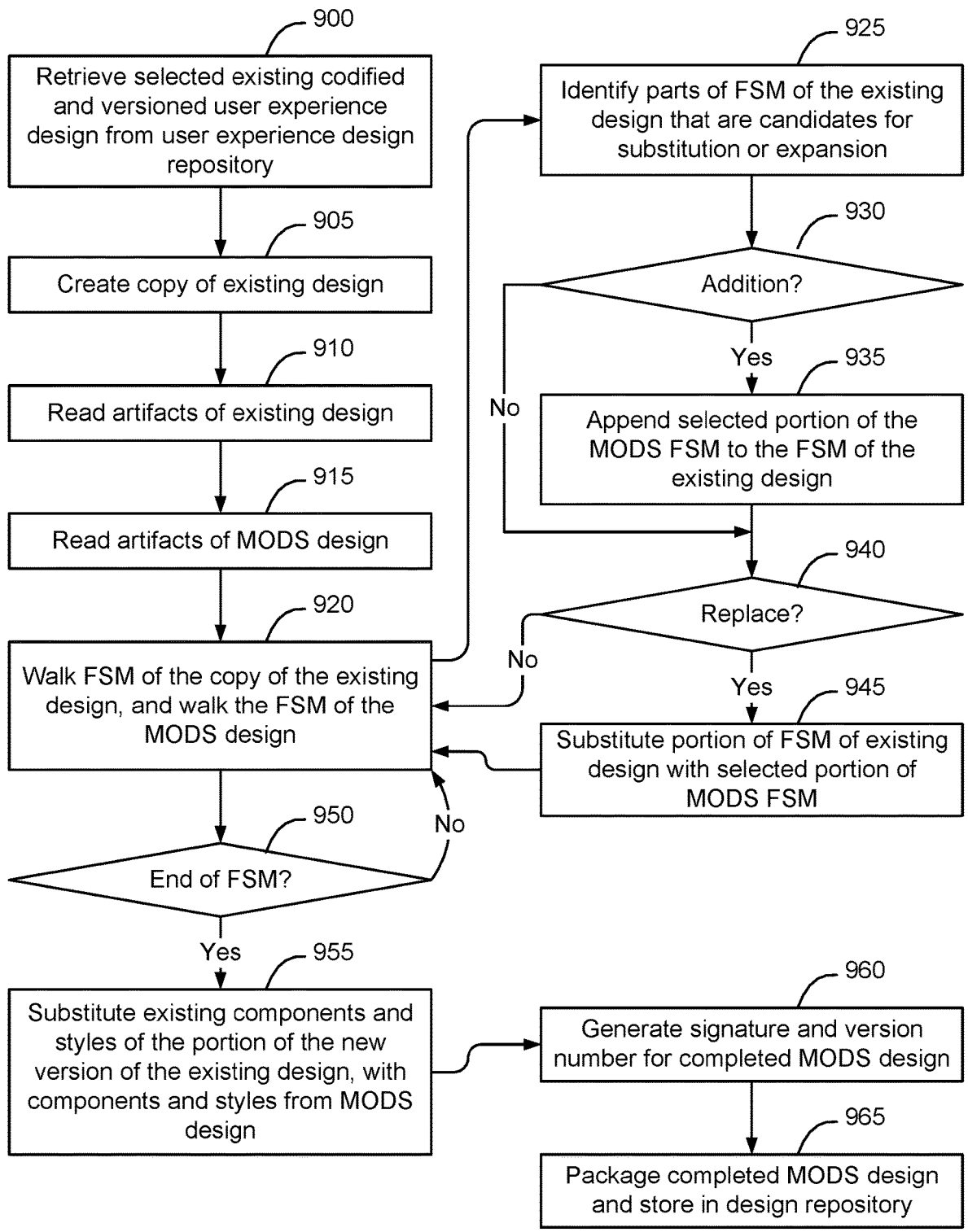
FIG. 9 is a flow chart of an example process of modifying a selected existing codified and versioned user experience design to create a new user experience design, according to some embodiments.

FIG. 9 is a flow chart of an example process of modifying an existing codified and versioned user experience design to create a new user experience design, according to some embodiments. As shown in FIG. 9, to create a new user experience design based on a previous codified and versioned user experience design, the design creation engine 700 retrieves the selected existing codified and versioned user experience design from the user experience design repository 145 (block 900) and makes a copy of the existing codified and versioned user experience design (block 905). By making a copy of the existing codified and versioned user experience design, the existing design continues to be stored in the user experience design repository 145. The design creation engine 700 reads the artifacts of the existing codified and versioned user experience design (block 910) and reads the artifacts of the MODS design (block 915). The finite state machine walker 715 then walks the finite state machine of the copy of the existing codified and versioned user experience design and the FSM of the MODS design (block 920) to identify parts of the FSM of the existing codified and versioned user experience design that are candidates for substitution or expansion (block 925).

When the finite state machine walker 715 encounters a portion of the FSM of the MODS design that is not contained in the FSM of the existing codified and versioned user experience design, the finite state machine walker determines that the portion of the FSM of the MODS design is a candidate for addition to the FSM of the new version of the existing design (block 930). In some embodiments, a prompt is generated via the user interface 155 to enable the design professional to select whether the portion of the FSM from the MODS design should be added to the FSM of the new version of the existing design. If the portion of the FSM from the MODS design is to be added to the FSM of the new version of the existing design (a determination of YES at block 930), the selected portion of the MODS FSM is appended to the FSM of the existing design at the selected location (block 935).

If the portion of the MODS design is not added to the FSM of the new version of the existing design (a determination of NO at block 930), the design creation engine 700 continues to determine whether a portion of the FSM of the new version of the existing design should be replaced with a portion of the FSM of the MODS design (block 940). If the portion of the FSM of the new version of the existing design is not to be replaced (a determination of NO at block 940) the process returns to block 920 to continue walking the FSM of the new version of the existing design and the FSM of the MODS design (block 920). If the portion of the FSM of the new version of the existing design is to be replaced (a determination of YES at block 940), the design professional is provided with a prompt via user interface 155 and, if replacement is authorized, the selected portion of the FSM of the new version of the existing design is replaced with the selected portion of the FSM of the MODS design (block 945). Although FIG. 9 shows the substitution module 730 processing additions to the FSM first, and processing replacements to the FSM second, these steps can occur in parallel or in the opposite order depending on the implementation.

The finite state machine walker 715 continues to walk the FSM of both the new version of the existing design and the FSM of the MODS design in a depth first or breadth first manner, marking each visited state, until it reaches the end of the FSM (a determination of YES at block 950).

In addition to creating an FSM for the new design, by adding portions of the MODS design to the FSM of the new version of the existing design, and by replacing portions of the FSM of the new design with portions of the FSM of the MODS design, the substitution module 730 also substitutes existing components of the existing design with components and styles from the MODS design (block 955). Although FIG. 9 shows the component and style substitutions occurring after the process has completed walking the FSM and making changes to the FSM of the new version of the existing design, the component and style substitution can occur before walking the FSM or may occur in parallel with walking the FSM, depending on the implementation.

Once the newly created design 740' is complete, the newly created design 740' is passed to the package generation and encoding subsystem 135 (block 960), and then to the signature marking and versioning subsystem 140 (block 965), and then placed in the user experience design repository 145. The design that was created in this manner may subsequently be used as the basis for a future MODS design, such that the new user experience design can be incrementally built using subsequent MODS designs.

For example, a first MODS design might be created that only includes FSM changes. When that MODS design is entered into the EDCMS, it can be used to create a new version of an existing design that has a different FSM than the original existing design, but which has the same components and styles as the original existing design.

Subsequently, a MODS design may be created that does not include any changes to the FSM, and only includes new component and style definitions. After walking the FSM of the new version of the existing design, and determining that there were no additions or replacements (a determination of NO at block 930 and a determination of NO at block 940), the design creation engine 700 would then apply the new style and component definitions to the new version of the existing design, to enable the new version of the existing design to be updated to include the new component and style definitions while retaining the same FSM logic.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, subsystems, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of using an existing codified user experience design to complete a partially constructed user experience design, comprising:

retrieving a user experience design from a user experience design repository, the partially constructed user experience design including persona metadata, outcome metadata, and partial user experience workflow metadata, a partial finite state machine generated from the partial workflow metadata, and a tag identifying the user experience design as a partially constructed user experience design;

identifying an existing codified user experience design from the user experience design repository to be used to complete the partially constructed user experience design, the existing codified user experience design including a finite state machine generated from workflow metadata of the existing codified user experience design;

retrieving a copy of the identified existing codified user experience design;

walking the partial finite state machine of the partially constructed user experience design while walking the finite state machine of the identified existing codified user experience design;

identifying a first aspect of the finite state machine of the identified existing codified user experience design that is a candidate for replacement of a second aspect of the partial finite state machine of the partially constructed user experience design; and substituting the second aspect of the partial finite state machine of the partially constructed user experience design with the first aspect of the finite state machine of the identified existing codified user experience design.

2. The method of claim 1, wherein the first aspect of the finite state machine contain first objects and first styles, wherein a portion of the partial finite state machine other than the second aspect contains second objects and second styles, and wherein the method further comprises replacing first objects and first styles of the first aspect of the finite state machine with corresponding second objects and second styles to cause all objects of the finite state machine of the partially constructed user experience design to be consistent.

3. The method of claim 1, wherein identifying an existing codified user experience design comprises searching the user experience design repository for existing codified user experience designs containing persona metadata and outcome metadata similar to the persona and outcome metadata of the partially constructed user experience design.

4. The method of claim 1, wherein identifying an existing codified user experience design comprises receiving input associated with a version number of the existing codified user experience design, the version number uniquely identifying the existing codified user experience design within the user experience design repository.

5. The method of claim 1, wherein the step of identifying a first aspect of the finite state machine of the identified existing codified user experience design is based on a substitution rule from an heuristics engine based on the persona of the partially constructed user experience design.

6. The method of claim 1, further comprising, after substituting the second aspect of the partial finite state machine of the partially constructed user experience design with the first aspect of the finite state machine of the identified existing codified user experience design, determining that the finite state machine of the partially constructed user experience designs is a complete finite state machine.

7. The method of claim 6, further comprising:
versioning the codified user experience design to create a versioned codified experience specification; and
storing the versioned codified user experience specification in the user experience design repository.

8. The method of claim 7, further comprising digitally signing the versioned codified user experience specification to create a digital signature of the versioned codified user experience specification, and storing the digital signature with the versioned codified user experience specification in the user experience design repository.

9. A method of using an existing codified user experience design to create a new user experience design, comprising:
retrieving a user experience design from a user experience design repository, the user experience design including persona metadata, outcome metadata, partial user experience workflow metadata, a partial finite state machine generated from the partial workflow metadata, and a tag identifying the user experience design as being configured to be used to modify the existing codified user experience design to create the new user experience design;
retrieving a copy of the existing codified user experience design from a user experience design repository, the copy of the existing codified user experience design including a finite state machine generated from workflow metadata of the codified user experience design and forming a basis of the new user experience design;
walking the finite state machine of the new user experience design while walking the partial finite state machine of the partially constructed user experience design;
identifying a first aspect of the finite state machine of the partially constructed user experience design that is a candidate for addition to the finite state machine of the new user experience design; and
adding the first aspect of the partial finite state machine of the partially constructed user experience design to the finite state machine of the new user experience design.

10. The method of claim 9, further comprising:
identifying a second aspect of the finite state machine of the partially constructed user experience design that is a candidate for replacement of a third aspect of the finite state machine of the new user experience design; and
replacing the third aspect of the finite state machine of the new user experience design with the second aspect of the partial finite state machine of the partially constructed user experience design.

11. The method of claim 9, wherein the partially constructed user experience design contains component and style definitions, the method further comprising applying the component and style definitions to the finite state machine of the new user experience design.

12. The method of claim 9, wherein identifying an existing codified user experience design comprises searching the user experience design repository for existing codified user experience designs containing persona metadata and outcome metadata similar to the persona and outcome metadata of the partially constructed user experience design.

13. The method of claim 9, wherein identifying an existing codified user experience design comprises receiving input associated with a version number of the existing codified user experience design, the version number uniquely identifying the existing codified user experience design within the user experience design repository.

14. The method of claim 9, further comprising, after adding the first aspect of the partial finite state machine of the partially constructed user experience design to the finite state machine of the new user experience design, determining that the new user experience design is complete.

15. The method of claim 14, further comprising:
versioning the new user experience design to create a versioned new user experience design; and
storing the versioned new user experience design in the user experience design repository.

16. The method of claim 15, further comprising digitally signing the versioned new user experience design to create a digital signature of the versioned new user experience design, and storing the digital signature with the versioned new user experience design in the user experience design repository.

17. A method of using an existing codified user experience design to create a new user experience design, comprising:
retrieving a user experience design from a user experience design repository, the user experience design including persona metadata, outcome metadata, component and style definitions, and a tag identifying the user experience design as being configured to be used to modify an existing codified user experience design to create the new user experience design;
retrieving a copy of the identified existing codified user experience design, the copy of the identified existing codified user experience design forming a basis of the new user experience design, the existing codified user experience design including a finite state machine generated from workflow metadata of the codified user experience design;
automatically creating the new user experience design by applying the component and style definitions to all components and styles of the retrieved copy of the identified existing codified user experience design to create; and
storing the new user experience design in the user experience design repository.

18. The method of claim 17, wherein identifying an existing codified user experience design comprises searching the user experience design repository for existing codified user experience designs containing persona metadata and outcome metadata similar to the persona and outcome metadata of the partially constructed user experience design.

19. The method of claim 17, wherein identifying an existing codified user experience design comprises receiving input associated with a version number of the existing codified user experience design, the version number uniquely identifying the existing codified user experience design within the user experience design repository.

20. The method of claim 17, further comprising:
  versioning the new user experience design to create a versioned new user experience design;
  digitally signing the versioned new user experience design to create a digital signature of the versioned new user experience design; and
  wherein the step of storing the new user experience design comprises storing the digitally signed and versioned new user experience design in the user experience design repository.

* * * * *